United States Patent
Kawai

(10) Patent No.: US 12,221,140 B2
(45) Date of Patent: Feb. 11, 2025

(54) ABNORMAL SITUATION ALARMING SYSTEM

(71) Applicant: NEC Corporation, Tokyo (JP)

(72) Inventor: Ryo Kawai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 842 days.

(21) Appl. No.: 17/423,365

(22) PCT Filed: Dec. 10, 2019

(86) PCT No.: PCT/JP2019/048301
§ 371 (c)(1),
(2) Date: Jul. 15, 2021

(87) PCT Pub. No.: WO2020/158197
PCT Pub. Date: Aug. 6, 2020

(65) Prior Publication Data
US 2022/0126896 A1   Apr. 28, 2022

(30) Foreign Application Priority Data

Jan. 28, 2019   (JP) .................. 2019-012231

(51) Int. Cl.
*B61L 23/04* (2006.01)
*B61L 27/18* (2022.01)
*B61L 27/50* (2022.01)
*G08B 21/02* (2006.01)

(52) U.S. Cl.
CPC ............ *B61L 23/041* (2013.01); *B61L 27/18* (2022.01); *B61L 27/50* (2022.01); *G08B 21/02* (2013.01)

(58) Field of Classification Search
CPC ........ B61L 23/041; B61L 27/18; B61L 27/50; G08B 21/02
See application file for complete search history.

(56) References Cited

U.S. PATENT DOCUMENTS

2017/0105106 A1   4/2017   Tsai

FOREIGN PATENT DOCUMENTS

| JP | 2003-224844 A | 8/2003 | |
| JP | 2003-246268 A | 9/2003 | |
| JP | 2004-106660 A | 4/2004 | |
| JP | 2005-273188 A | 10/2005 | |
| JP | 2007025962 A * | 2/2007 | ............. G08B 27/00 |
| JP | 2009-190431 A | 8/2009 | |
| JP | 2009202635 A * | 9/2009 | ............. B61L 23/00 |
| JP | 2013-196332 A | 9/2013 | |
| JP | 2017-019351 A | 1/2017 | |

OTHER PUBLICATIONS

International Search Report for PCT Application No. PCT/JP2019/048301, mailed on Jan. 28, 2020.

* cited by examiner

*Primary Examiner* — Robert J McCarry, Jr.

(57) ABSTRACT

An abnormal situation alarming system includes a detection unit that detects an abnormal situation, an acquisition unit that acquires, when the abnormal situation is detected, information representing the circumstances of the location where the abnormal situation occurred, a calculation unit that calculates the time allowable for handling the abnormal situation from a detection result of the abnormal situation and an acquisition result of the information, and an alarming unit that gives an alarm of the detection result of the abnormal situation and a calculation result of the time.

15 Claims, 11 Drawing Sheets

100 ABNORMAL SITUATION ALARMING SYSTEM

FIG. 5

| RAILWAY TRACK NO. \ RAILWAY TRACK NO. | 122 | 123 | 124 | 125 | 126 |
|---|---|---|---|---|---|
| 122 |  | ○ | × | × | × |
| 123 | ○ |  | × | × | × |
| 124 | × | × |  | ○ | ○ |
| 125 | × | × | ○ |  | ○ |
| 126 | × | × | ○ | ○ |  |

$$T = \min_{1 \leq k \leq n} (t_k - s_k) - t_0 - s \quad \cdots (1)$$

$$s_k = \frac{360}{v_k} + \frac{v_k}{4} + 30(s) \quad \cdots (2)$$

$$s_k = \frac{360}{v_k} + \frac{v_k}{4} + 60(s) \quad \cdots (3)$$

$$s = -s_i, \quad i = \operatorname*{argmin}_{1 \leq k \leq n}(t_k - s_k) \quad \cdots (4)$$

$$s = \frac{\min_{1 \leq k \leq n}(t_k - s_k) - t_0}{2} \quad \cdots (5)$$

$$s = \frac{d}{v_p} \quad \cdots (6)$$

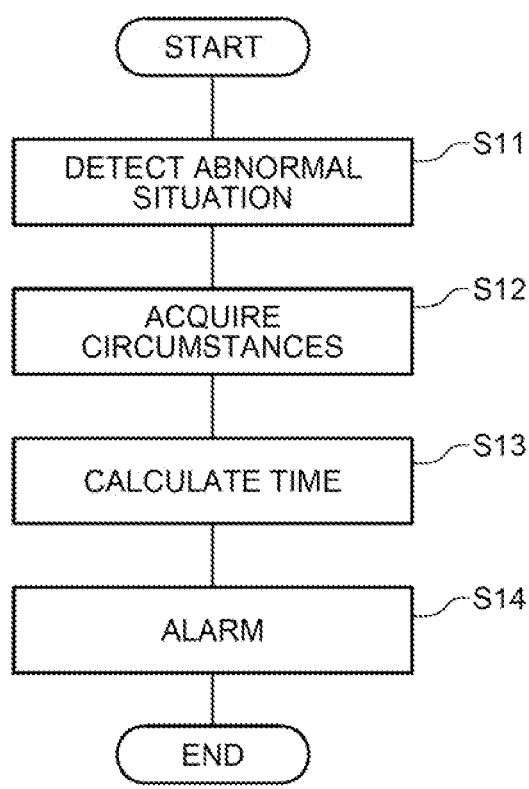

ABNORMAL SITUATION ALARMING SYSTEM

This application is a National Stage Entry of PCT/JP2019/048301 filed on Dec. 10, 2019, which claims priority from Japanese Patent Application 2019-012231 filed on Jan. 28, 2019, the contents of all of which are incorporated herein by reference, in their entirety.

TECHNICAL FIELD

The present invention relates to an abnormal situation alarming system, an abnormal situation alarming method, and a storage medium.

BACKGROUND ART

An abnormal situation means a state deviating from a certain standard. If an abnormal situation is left as it is, it may lead to an accident. Therefore, a system of detecting an abnormal situation and giving an alarm has been proposed.

For example, in Patent Literature 1, a dangerous area is set in part of a station platform, and when a monitoring target person such as a drunken person or a visually impaired person enters the dangerous area, it is detected as an abnormal situation and an alarm signal is output. Moreover, in Patent Literature 1, by setting a dangerous area corresponding to the danger level of a monitoring target person or the circumstances (congestion level, train operating condition, or the like), it is possible to detect an abnormal situation more accurately.

In Patent Literature 2, when a person falls from a station platform to the track of a train, it is detected as an abnormal situation, and an alarm lamp provided to the station platform or the station administrative office is lit, whereby an alarm signal is output to the station staff and the like.
Patent Literature 1: JP 2003-224844 A
Patent Literature 2: JP 2017-19351 A

SUMMARY

By detecting occurrence of an abnormal situation and giving an alarm, it is possible to allow the staff to recognize occurrence of an abnormal situation immediately. However, it is difficult to cause the staff to handle the abnormal situation on an ad hoc basis only by giving an alarm. This is because while the time allowable for handling the abnormal situation varies depending on the circumstances, it is difficult for the staff to unerringly recognize the circumstances at the time point when the alarm is given and to accurately recognize the time allowable for handling the abnormal situation. That is, in the case of an abnormal situation that occurs at a platform of a station, in a station having a bulletin board indicating the clock time of the next incoming train, when an abnormal situation of a fall of a person from the platform of the station to the railway track of the train occurs, the station staff of the like can recognize the time allowable for handling the abnormal situation by checking the display of the bulletin board, calculating the time difference from the current clock time, and the like. However, as characteristics of the action by a person, when a person encounters an abnormal situation, in the stage of acquiring information from the outside, it is said that narrowing of viewing may occur in which only a specific type of information among various types of information is concentrated on and the current state cannot be grasped multilaterally. Moreover, it is also said that even if information can be obtained, in the stage of processing the obtained information, processing that is different from the normal may be performed. Therefore, it is not necessarily the case that the station staff or the like can always accurately recognize the time allowable for handling the abnormal situation, from the arrival time displayed on the bulletin board and the current time. Moreover, since the bulletin board of the station is unlikely to display the passing time of a passing train, in the case where the train coming to the railway track next is a passing train, it is impossible to calculate the time allowable for handling the abnormal situation from the display of the bulletin board. Due to the circumstances described above, there is a case where it is difficult for the staff to accurately grasp the time allowable for handling the abnormal situation that has occurred. As a result, it is impossible to cope with the abnormal situation on an ad hoc basis.

An object of the present invention is to provide an abnormal situation alarming system that solves the problem described above, that is, a problem that it is difficult to cope with an abnormal situation on an ad hoc basis.

An abnormal situation alarming system according to one aspect of the present invention includes
  a detection unit that detects an abnormal situation;
  an acquisition unit that acquires, when the abnormal situation is detected, information representing the circumstances of a location where the abnormal situation occurred;
  a calculation unit that calculates the time allowable for handling the abnormal situation, from a detection result of the abnormal situation and an acquisition result of the information; and
  an alarming unit that gives an alarm of the detection result of the abnormal situation and a calculation result of the time.

An abnormal situation alarming method according to another aspect of the present invention includes
  detecting an abnormal situation;
  upon detection of the abnormal situation, acquiring information representing the circumstances of a location where the abnormal situation occurred;
  calculating the time allowable for handling the abnormal situation, from a detection result of the abnormal situation and an acquisition result of the information; and
  giving an alarm of the detection result of the abnormal situation and a calculation result of the time.

A computer-readable storage medium according to another aspect of the present invention stores therein a program for causing a computer to perform processing of
  detecting an abnormal situation;
  upon detection of the abnormal situation, acquiring information representing the circumstances of a location where the abnormal situation occurred;
  calculating the time allowable for handling the abnormal situation, from a detection result of the abnormal situation and an acquisition result of the information; and
  giving an alarm of the detection result of the abnormal situation and a calculation result of the time.

With the configurations described above, the present invention enables an abnormal situation to be coped with on an ad hoc basis according to the circumstances.

BRIEF DESCRIPTION OF DRAWINGS

FIG. 5 illustrates an example of railway track information in the abnormal situation alarming system according to the first exemplary embodiment of the present invention.

FIG. 8 illustrates expressions used by a calculation unit in the abnormal situation alarming system according to the first exemplary embodiment of the present invention.

FIG. 11 is a flowchart of an operation of the abnormal situation alarming system according to the second exemplary embodiment of the present invention.

EXEMPLARY EMBODIMENTS

Next, exemplary embodiments of the present invention will be described with reference to the drawings.

First Exemplary Embodiment

Figure 1:
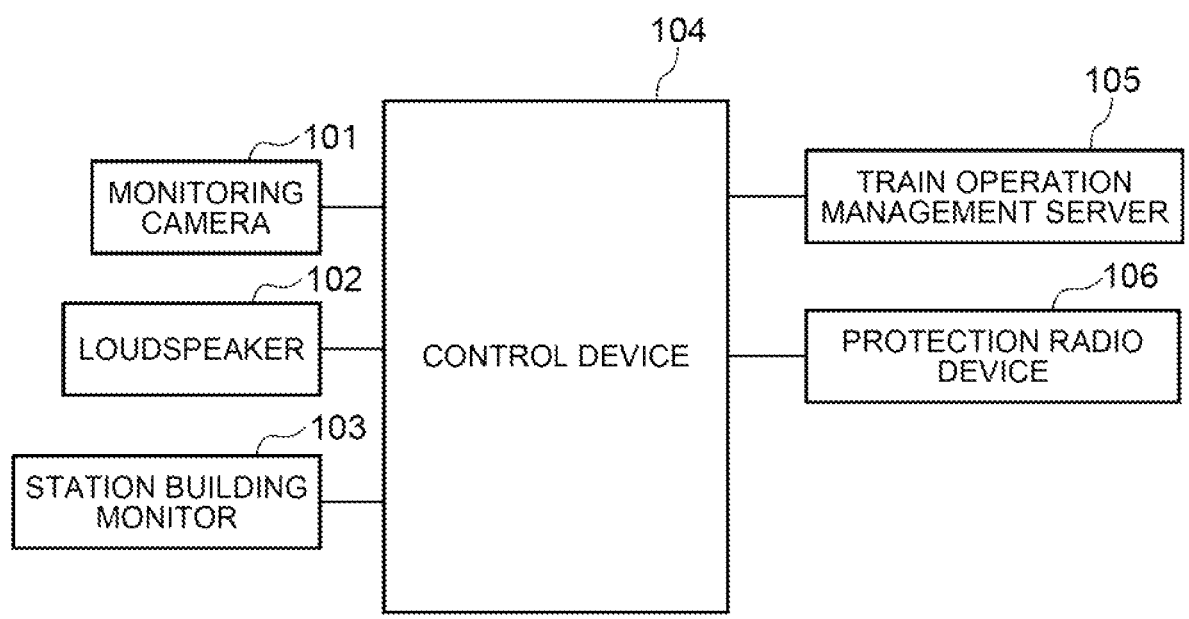
FIG. 1 is a block diagram of an abnormal situation alarming system according to a first exemplary embodiment of the present invention.
Figure 2:
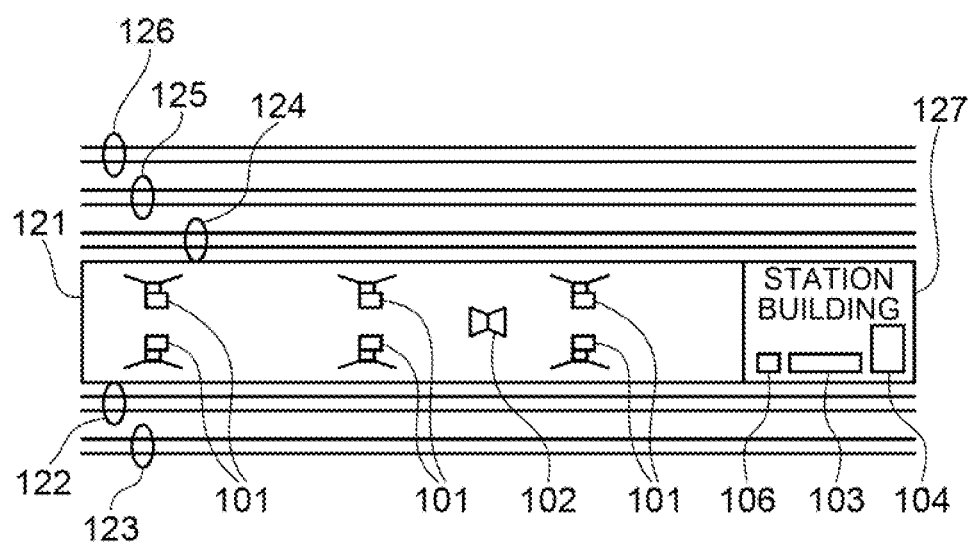
FIG. 2 is a plan view of a station to which the abnormal situation alarming system according to the first exemplary embodiment of the present invention is applied.

FIG. 1 is a block diagram of an abnormal situation alarming system 100 according to a first exemplary embodiment of the present invention. FIG. 2 is a plan view of an exemplary station to which the abnormal situation alarming system 100 according to the present embodiment is applied. The abnormal situation alarming system 100 according to the present embodiment is configured to detect a fall of a person or the like from a platform 121 of a station to one of railway tracks 122 to 126 as an abnormal situation, and give an alarm.

The abnormal situation alarming system 100 is configured to include a monitoring camera 101, a loudspeaker 102, a station building monitor 103, and a control device 104 connected thereto. The control device 104 is also connected to a train operation management server 105 and a protection radio device 106.

The monitoring camera 101 is provided to a platform 121 of a station for example, and is used as a sensor for detecting a fall of an object from the platform 121 to any of railway tracks 122 to 126. When the scale of the platform 121 is large, the monitoring area is divided into small areas in each of which one monitoring camera 101 can cope with, and at least one monitoring camera 101 is provided to each of the small areas. The monitoring camera 101 is configured to transmit images captured at a certain frame rate (frame images) to the control device 104 while adding the capturing clock time and the camera identification information thereto. The monitoring camera 101 may be a visible light camera or an infrared camera. Note that the sensor for detecting a fall of an object to a railway track is not limited to the monitoring camera 101. For example, it is possible to detect a fall of a person or the like from a platform to a railway track by a 3D range image sensor, a range sensor, an infrared sensor, or the like.

The loudspeaker 102 is provided to the platform 121 of a station for example, and is configured to raise an alarm by sound. In FIG. 2, two loudspeakers 102 are provided at the center of the platform 121 while being disposed back to back. However, the number and the installation location of the loudspeakers 102 are not limited thereto.

The station building monitor 103 is provided inside the station building 127, and is configured to display the video of the monitoring camera 101 and an alarm on the screen, and also output the alarm by sound.

The train operation management server 105 is configured to unitarily manage operation records (station arrival/departure time and the like) of each train. In the example illustrated in FIG. 2, the train operation management server 105 is provided to the station building 127, but may be provided to a place other than the station.

The protection radio device 106 is configured to inform nearby stations and railway vehicles traveling in the vicinity thereof of occurrence of an emergency situation though radio communication. In the example illustrated in FIG. 2, the protection radio device 106 is provided to the station building 127, but may be provided to a place other than the station.

The control device 104 is provided inside the station building 127 for example. The control device 104 is connected to the monitoring camera 101, the loudspeaker 102, the station building monitor 103, the train operation management server 105, and the protection radio device 106, by a wired or wireless manner. The control device 104 is configured to detect a fall of an object from the platform 121 to any of the railway tracks 122 to 126 as an abnormal situation, on the basis of the video of the monitoring camera 101. The control device 104 is also configured to detect attributes of a fallen object. Exemplary attributes include whether the fallen object is a person or an article, and if it is a person, sex, age group, disabilities, and the like. The control device 104 is also configured to, when detecting an abnormal situation, acquire operation information of the trains as information representing the circumstances of the location where the abnormal situation has occurred, from the train operation management server 105. The control device 104 is also configured to calculate the time allowable for handling the abnormal situation from the detected abnormal situation and the acquired operation information of the train. The control device 104 is also configured to use the loudspeaker 102 and the station building monitor 103 to give an alarm of the detected abnormal situation and the calculated time. The control device 104 is configured to, when a predetermined condition is satisfied, use the protection radio device 106 to inform nearby stations and railway vehicles traveling in the vicinity thereof of occurrence of an emergency situation though radio communication.

Figure 3:
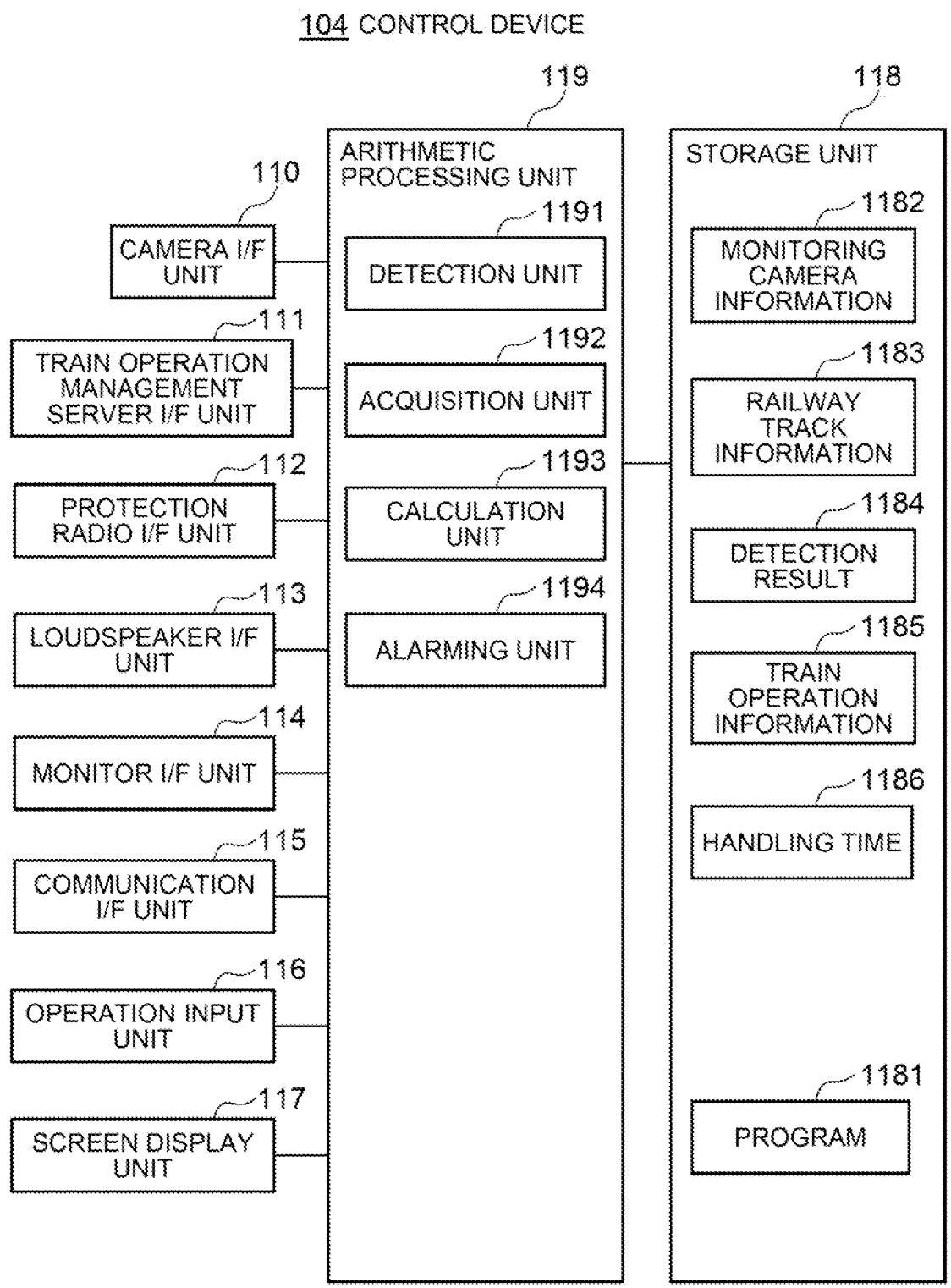
FIG. 3 is a block diagram illustrating an exemplary control device in the abnormal situation alarming system according to the first exemplary embodiment of the present invention.

FIG. 3 is a block diagram illustrating an example of the control device 104. Referring to FIG. 3, the control device 104 is configured to include a camera interface (I/F) unit 110, a train operation management server I/F unit 111, a protection radio I/F unit 112, a loudspeaker I/F unit 113, a monitor I/F unit 114, a communication I/F unit 115, an operation input unit 116, a screen display unit 117, a storage unit 118, and an arithmetic processing unit 119.

Each of the camera I/F unit 110, the train operation management server I/F unit 111, the protection radio I/F unit 112, the loudspeaker I/F unit 113, and the monitor I/F unit 114 is configured to transmit and receive signals with the monitoring camera 101, the train operation management server 105, the protection radio device 106, the loudspeaker 102, and the station building monitor 103.

The communication I/F unit 115 is a communication device that performs data communication with an external device such as a terminal. The operation input unit 116 includes input devices such as a keyboard and numeric keys, and is configured to detect an operation by an operator and output it to the arithmetic processing unit 119. The screen display unit 117 is a screen display device such as a liquid crystal display (LCD), and is configured to display, on a screen, various types of information such as an operation menu according to an instruction from the arithmetic processing unit 119.

The storage unit 118 includes storage devices such as a hard disk and a memory. The storage unit 118 is configured to store processing information and a program 1181 necessary for various types of processing to be performed in the arithmetic processing unit 119. The program 1181 is read and executed by the arithmetic processing unit 119 to thereby implement various processing units. The program 1181 is read from an external device (not illustrated) or a storage medium (not illustrated) via a data input and output function such as the communication I/F unit 115 in advance, and stored in the storage unit 118.

The main processing information stored in the storage unit 118 includes monitoring camera information 1182, railway track information 1183, a detection result 1184, train operation information 1185, and handling time 1186.

Figure 4:
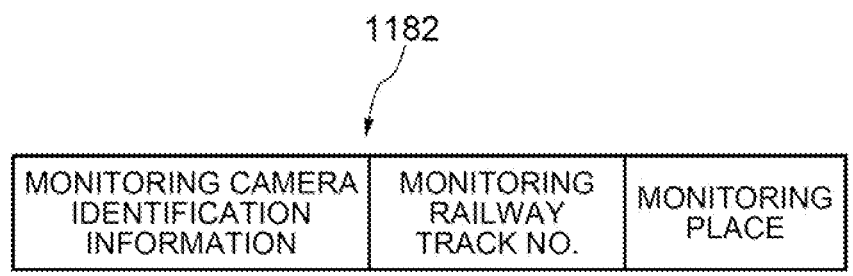
FIG. 4 illustrates an example of monitoring camera information in the abnormal situation alarming system according to the first exemplary embodiment of the present invention.

The monitoring camera information 1182 is information managing identification information of the monitoring camera 101, and the like. FIG. 4 illustrates an example of the monitoring camera information 1182. The monitoring camera information 1182 of this example is configured to include monitoring camera identification information, a monitoring railway track number, and a monitoring place. The monitoring camera identification information is information uniquely identifying the monitoring camera 101. The monitoring railway track number is a number uniquely identifying the railway track monitored by the monitoring camera 101. The monitoring place is information indicating the rough position of the area monitored by the monitoring camera 101. For example, the monitoring place can be expressed by using the distance from the station building 127, but is not limited thereto.

When there are a plurality of railway tracks in the station, the railway track information 1183 is information indicating the relationship between railway tracks. FIG. 5 illustrates an example of the railway track information 1183 indicating the relationship between the five railway tracks 122 to 126 of FIG. 2. The railway track information 1183 of this example shows the relationship between a plurality of railway tracks in a matrix. Here, a mark "○" described at an intersection point of a row and a column shows that the railway track identified by the railway track number of the row and the railway track identified by the railway track number of the column run parallel to each other without any obstacle such as a platform being interposed between them. Further, a mark "x" described at an intersection point of a row and a column shows that there is an obstacle such as a platform interposed between the railway track identified by the railway track number of the row and the railway track identified by the railway track number of the column.

Figure 6:
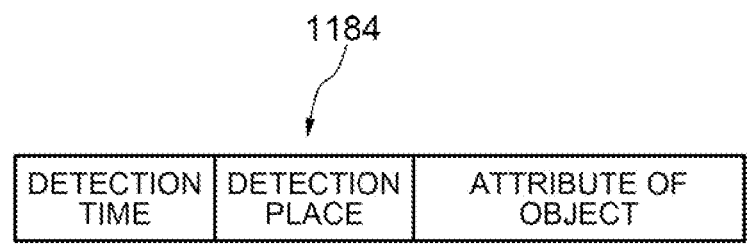
FIG. 6 illustrates an example of a detection result in the abnormal situation alarming system according to the first exemplary embodiment of the present invention.

The detection result 1184 is information about an abnormal situation detected based on the video of the monitoring camera 101. FIG. 6 illustrates an example of the detection result 1184. The detection result 1184 of this example is configured to include the detection time, the detection place, and an object attribute. The detection time indicates the clock time when a fall of an object from a platform to a railway track is detected. The detection place indicates the identification information of the monitoring camera 101, and the railway track number of the railway track in which the fall is detected. The object attribute indicates whether the fallen object is a person or an article, and if the object is a person, sex, age group, disabilities, and the like, while if the object is an article, the size or the like thereof.

Figure 7:
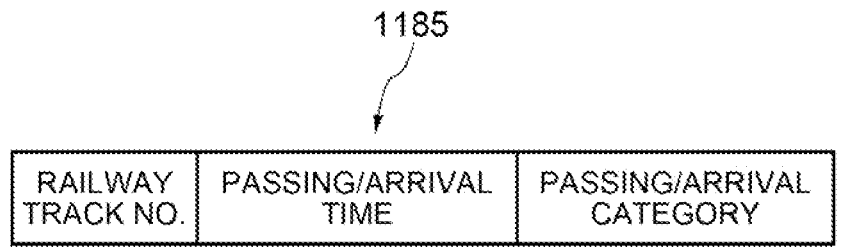
FIG. 7 illustrates an example of train operation information in the abnormal situation alarming system according to the first exemplary embodiment of the present invention.

The train operation information 1185 is information about operation information of a train acquired as information representing the circumstances of the location where the abnormal situation has occurred. FIG. 7 illustrates an example of the train operation information 1185. The train operation information 1185 of this example is configured to include the railway track number, passing/arrival time, and passing/arrival category. The railway track number indicates the identification information of the railway track. The passing/arrival time indicates the passing time or arrival time of the train that will pass through or arrive at the railway track identified by the railway track number first after the abnormal situation occurrence time. The passing/arrival category indicates whether the passing/arrival time is the passing time or the arrival time.

The handling time 1186 indicates the time allowable for handling the abnormal situation.

The arithmetic processing unit 119 is an arithmetic processing unit having a microprocessor such as an MPU and its peripheral circuits. The arithmetic processing unit 119 is configured to read the program 1181 from the storage unit 118 and execute it to thereby allow the hardware and the program 1181 to operate in cooperation with each other to implement various processing units. The processing units implemented by the arithmetic processing unit 119 includes a detection unit 1191, an acquisition unit 1192, a calculation unit 1193, and an alarming unit 1194.

The detection unit 1191 is configured to detect a fall of an object from a platform to a railway track, on the basis of an image of the monitoring area input from the monitoring camera 101 via the camera I/F unit 110. For example, the detection unit 1191 can detect the object fallen from the platform to the railway track by calculating the difference between continuous frame images. The detection unit 1191 is also configured to determine whether the object fallen to the railway track is a person or an article, on the basis of the images. For example, the detection unit 1191 can determine whether the fallen object is a person or an article other than a person, by comparing the feature amounts such as size and shape of the area of the detected object and clothes with the feature amounts of a male and a female from an adult to a child. The detection unit 1191 is also configured to, when the fallen object is a person, determine sex, age group, and presence/absence of disabilities of the fallen person on the basis of the images. For example, the detection unit 1191 can determine sex of the fallen person by checking that the feature amounts such as size, shape, and clothes of the area of the detected person conform to the feature amounts of which of a female and a male. The detection unit 1191 can also determine the age group of the fallen person by checking that the feature amounts such as size, shape, and clothes of the area of the detected person conform to the feature amounts of which of a child and an adult. The detection unit 1191 can also trace back the video of the detected person retroactively, and if confirming that the person uses a stick, determines that the person has a disability in the leg. The detection unit 1191 can also determine the size of the object on the basis of the occupying size in the image of the area of the fallen object.

In this way, the detection unit 1191 regularly detects a fall of an object from a platform of a station to a railway track and the attributes of the fallen objects. The method of analyzing images of a camera to detect a fall of an object from a platform to a railway track, the method of determined whether the fallen object is a person or an article, and when the object is a person, the method of determining sex, age group, presence/absence of disabilities, and when the object is an article, the method of determining the size thereof, are not limited to those described above, and any methods can be used. The detection unit 1191 is configured to, upon detection, store the results thereof in the storage unit 118 as the detection result 1184.

The acquisition unit 1192 is configured to, when an abnormal situation is detected by the detection unit 1191, acquire information representing the circumstances of the location where the abnormal situation has occurred. Specifically, the acquisition unit 1192 first reads the detection result 1184 from the storage unit 118. Then, the acquisition unit 1192 acquires the detection time and the detection place from the readout detection result 1184. Then, the acquisition unit 1192 acquires, from the acquired detection place, the railway track number of the railway track where falling has been detected as a candidate of the target railway track number. Then, the acquisition unit 1192 acquires, from the railway track information 1183, the railway track number of another railway track running parallel to the railway track of the target railway track number without any obstacle such as a platform being interposed between them, as another candidate of target railway track number. The, for each of the target railway track numbers, the acquisition unit 1192 acquires, from the train operation management server 105, the passing/arrival time of a train that will pass through or arrive at the railway track of the target railway track number first after the detection time. Then, for each of the target railway track numbers, the acquisition unit 1192 creates the train operation information 1185 configured of the acquired passing/arrival time, the railway track number, and the passing/arrival category, and stores it in the storage unit 118. As described above, for each of the railway track to which an object has been fallen and the railway track running in parallel therewith, the acquisition unit 1192 acquires the passing/arrival time of the train that will pass or arrive first after the occurrence of the fall case.

The calculation unit 1193 is configured to, when an abnormal situation is detected by the detection unit 1191, calculate the time allowable for handling the detected abnormal situation and store it in the storage unit 118 as the handling time 1186. Specifically, the calculation unit 1193 calculates a handling time T using Expression 1 shown in FIG. 8.

In Expression 1, parameters other than the handling time T are defined as follows:

(a) $t_0$ represents the current time,
(b) $r_1$ represents a railway track to which a fall of a person or an article has occurred,
(c) Assuming that there are n−1 railway tracks running parallel to the railway track $r_1$ without any obstacles such as a platform being interposed (in total, n railway tracks including $r_1$), $r_2, \ldots, r_n$ represent those railway tracks,
(d) $c_k$ represents a train that will pass through or arrive at a railway track $r_k$ (1≤k≥n) next (after the time $t_0$), and tk represents the passing/arrival time thereof,
(e) $s_k$ represents the time required to be secured for the security in consideration of the situations of the railway track $r_k$ and the train $c_k$, and
(f) s represents the adjustment time in consideration of attributes, occurrence place, and the like of the fallen object.

The calculation unit 1193 reads the detection result 1184 from the storage unit 118, extracts the railway track number of the railway track in which a fall is detected from the detection result 1184, and the railway track identified by the extracted railway track number is defined as the railway track $r_1$. The calculation unit 1193 also extracts the railway track number of another railway track running parallel to the railway track $r_1$ without any obstacles such as a platform being interposed between them from the railway track information 1183, and defines it as $r_2, \ldots, r_n$. For example, when the railway track $r_1$ is the railway track 122 of FIG. 2, the railway track $r_2$ is the railway track 123. The calculation unit 1193 reads the train operation information 1185 about the railway track $r_k$ from the storage unit 118, and defines the passing/arrival time thereof as $t_k$.

The calculation unit 1193 determines $s_k$ as described below. First, description will be given on the case where a train travelling on the railway track $r_k$ is a train that will stop at the station. The calculation unit 1193 determines $s_k$ so as to satisfy Expression 2 shown in FIG. 8, such that the train $c_k$ can stop before the occurrence place even if handling takes time and the protection radio is given after T=0 is satisfied. In Expression 2, $v_k$ represents the speed limit (km/h) of the train $c_k$ traveling on the railway track $r_k$. The time T determined according to Expression 2 corresponds to the time calculated by adding a margin of 30 seconds to the time for the train $c_k$, traveling on the railway track $r_k$ at just the speed limit $v_k$, to stop 100 m before the occurrence place with the emergency brake (assumed to be −4 km/h/s that is average acceleration of emergency brake of the Japanese train).

In the case of a passing train, the entering speed is faster than that of a train that will stop at the station. Therefore, in the case where the train $c_k$ traveling on the railway track $r_k$ is a passing train, the calculation unit 1193 determines a value having additional 30 seconds to be the $s_k$ value, as shown in Expression 3 of FIG. 8. Here, the calculation unit 1193 determines whether the train $c_k$ is a passing train or a train that will stop at the station, according to the passing/arrival category of the train operation information 1185 about the train $c_k$. Further, while the calculation unit 1193 holds the speed limit $v_k$ as a fix value, the calculation unit 1193 may acquire and use the speed limit $v_k$ of the train $c_k$ from the train operation management server 105 each time.

Next, a method of determining the adjustment time s will be described. One method of determining the adjustment time s is a method of setting it as a predetermined fix value. That is, the calculation unit 1193 sets the adjustment time s to be always 0. Another method of determining the adjustment time s is a method of determining the adjustment time s on the basis of an attribute of a fallen object. Hereinafter, some methods of determining the adjustment time s on the basis of an attribute of a fallen object will be illustrated.

A first method is a method of determining the adjustment time s on the basis of whether a fallen object is a person or an article. For example, when a fallen object is an article, the calculation unit 1193 sets the adjustment time s to be a negative value to increase the handling time T. As a negative value, for example, a value of s calculated by Expression 4 of FIG. 8 may be used. When the value calculated by Expression 4 is used as s, $s_k$ is canceled and the handling time T is increased. However, in the case of a large object, contact may lead to a serious accident. Therefore, when the size of an object is a threshold or larger, the calculation unit 1193 may calculate the adjustment time s as a given value equal to or larger than 0. On that other hand, when the fallen object is a person, the calculation unit 1193 sets the adjustment time s to be a given value equal to or larger than 0.

A second method is a method of determining the adjustment time s on the basis of whether a fallen person is a person who is difficult to evade by himself/herself such as an elderly person, a child, a disabled person, or the like. For example, in the case of a person who is difficult to evade by himself/herself, the calculation unit 1193 determines a value calculated by Expression 5 of FIG. 8 to be the adjustment time s. By using the adjustment time s given by Expression 5, the handling time T given by Expression 1 can be reduced to half. On that other hand, in the case of an object other than that, the calculation unit 1193 sets the adjustment time s to be 0, for example.

A third method is a method of determining the adjustment time s by classifying objects into three types, namely, a person who is difficult to evade by himself/herself such as an elderly person, a child, or a disabled person, a female who can evade by herself but needs more time because of weaker compared with a male, and the other objects. For example, in the case of a person who is difficult to evade by himself/herself, the calculation unit 1193 determines a value calculated by Expression 5 of FIG. 8 to be the adjustment time s. In the case of a female, the calculation unit 1193 calculates a small positive value such as 30 (seconds) as the adjustment time s. In the case of the other objects, the calculation unit 1193 sets the adjustment time s to be 0, for example.

A fourth method is a method of determining the adjustment time s according to the place where a fall occurs. For example, the calculation unit 1193 calculates a value given by Expression 6 of FIG. 8 as the adjustment time s. In Expression 6, d represents a distance (m) between the place where a fall has occurred and the station building 127. The detection place in the detection result 1184 includes the identification information of the monitoring camera 101 that detects the fall. Further, in the monitoring camera information 1182, the monitoring place is described in association with the identification information of the monitoring camera, and in the monitoring place, the distance between the area monitored by the monitoring camera 101 and the station building 127 is described. The calculation unit 1193 can roughly calculate the distance between the place where the fall has occurred and the station building 127 on the basis of the detection result 1184 and the monitoring camera information 1182. In Expression 6, $v_p$ represents an expected moving velocity of the station staff. $v_p$ may be a fix value such as 2 m/s (7.2 km/h). Alternatively, it is also possible to estimate the congestion degree of people on the platform from the video of the monitoring camera 101 or the like, and when it is crowded, the estimated velocity may be lowered to 6 km/h, 4.8 km/h, or the like.

Then, the alarming unit 1194 illustrated in FIG. 3 is configured to give an alarm indicating that an abnormal situation has occurred from the loudspeaker 102 and the station building monitor 103 by the sound and an image, on the basis of the detection result 1184 of the abnormal situation by the detection unit 1191. The alarming unit 1194 is also configured not only to give an alarm simply, but also give the time T allowable for handling the abnormal situation having been occurred by the sound and an image, on the basis of the handling time 1186 calculated by the calculation unit 1193. An alarm of the handling time T by the sound may be made by reading the handling time T itself. Further, an alarm of the handling time T by an image may be made by displaying the handling time T with a numerical value. Alternatively, an alarm of the handling time T by the sound and an image may be made such that when the handling time is longer than a predetermined time (for example, five minutes), it is also possible to inform that there is a sufficient time, by the sound and an image.

The alarming unit 1194 is also configured to, when the handling time T becomes 0 or smaller, transmit, via the protection radio I/F unit 112, an instruction to the protection radio device 106 to transmit protection radio.

Figure 9:
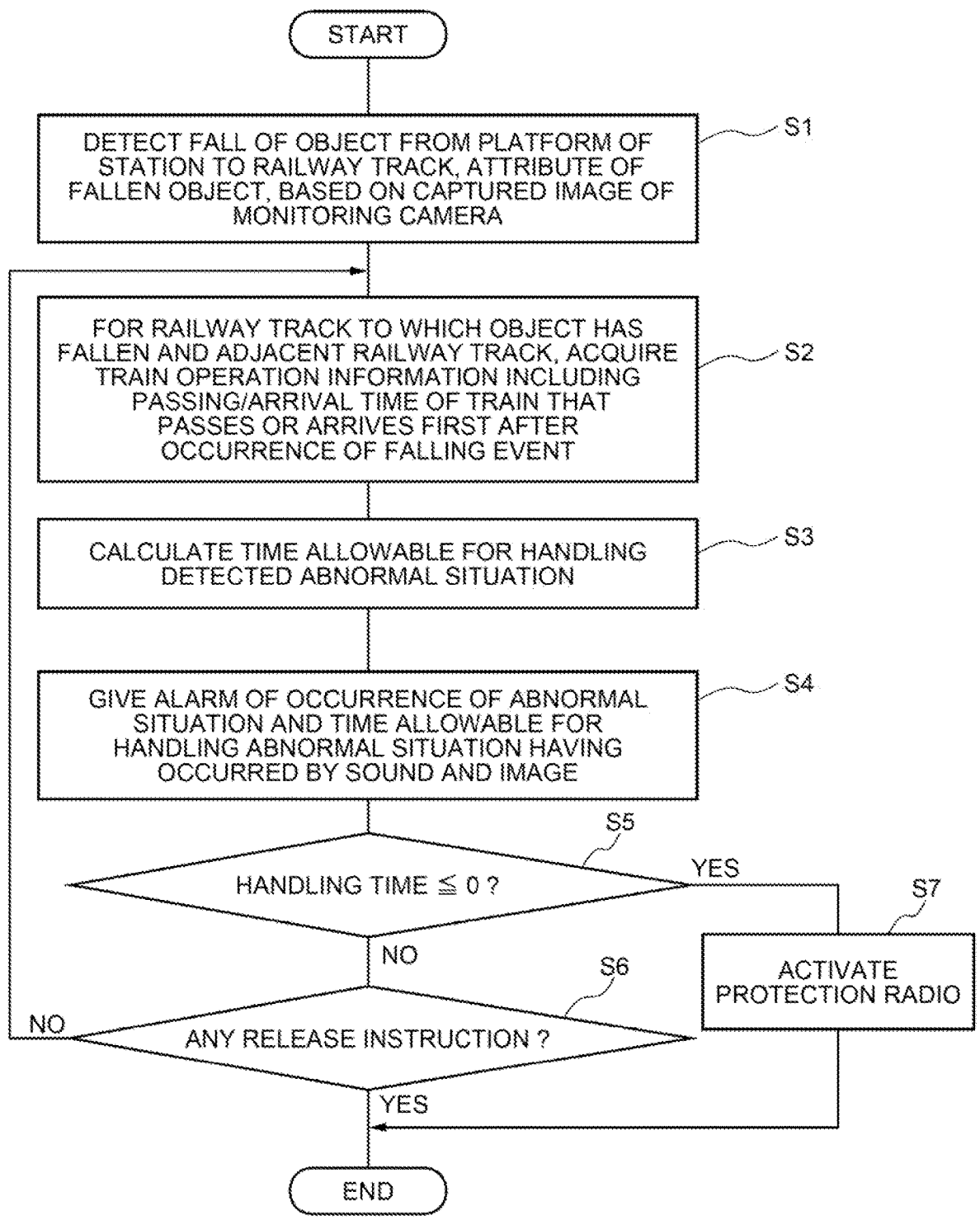
FIG. 9 is a flowchart of an exemplary operation of the abnormal situation alarming system according to the first exemplary embodiment of the present invention.

FIG. 9 is a flowchart of an exemplary operation of the abnormal situation alarming system 100. Hereinafter, operation of the abnormal situation alarming system 100 will be described with reference to FIG. 9.

The detection unit 1191 in the control device 104 of the abnormal situation alarming system 100 regularly performs detection of a fall of an object from a platform of a station to a railway track, and detection of the attribute of the fallen object, on the basis of images of the monitoring area input from the monitoring camera 101 (step S1).

When an abnormal situation is detected by the detection unit 1191, for each of the railway track to which an object has been fallen and the railway track running in parallel therewith, the acquisition unit 1192 acquires the train operation information including the passing/arrival time of the train that will pass or arrive first after the occurrence of the fall case (step S2). Further, when the abnormal situation is detected by the detection unit 1191 and the train operation information is acquired by the acquisition unit 1192, the calculation unit 1193 calculates the time allowable for handling the detected abnormal situation on the basis thereof (step S3). Then, the alarming unit 1194 gives an alarm indicating that an abnormal situation has occurred from the loudspeaker 102 and the station building monitor 103, on the basis of the detection result by the detection unit 1191 and the calculation result by the calculation unit 1193 (step S4). At that time, the alarming unit 1194 not only simply gives an alarm but also gives information of the time allowable for handling the abnormal situation having been occurred by the sound and an image.

The alarming unit 1194 determines whether or not the handling time T is 0 or smaller (step S5), and when it is not 0 or smaller, the alarming unit 1194 determines whether or not a release instruction is input from the operation input unit 116 or the like (step S6). When the handling time T is not 0 or smaller and a release instruction is not issued, the processing returns to step S2 and the same processing is repeated. Therefore, the acquisition unit 1192 acquires the train operation information again, the calculation unit 1193 recalculates the handling time on the basis of the latest train operation information acquired again and the elapse of time, and on the basis of the recalculated handling time, the alarming unit 1194 gives an alarm repeatedly and gives the latest time allowable for handling the abnormal situation by the sound and an image. Meanwhile, when the handling time is 0 or smaller, the alarming unit 1194 transmits protection radio via the protection radio device 106 (step S7). When a release instruction is input, the processing of FIG. 9 ends. Note that the processing may return from step S6 to step S3, rather than returning from step S6 to step S2. In that case, however, it is difficult to respond to a change in the train operation information.

As described above, according to the present embodiment, a fall of an object from a platform of a station to a railway track is detected as an abnormal situation, and not only an occurrence of an abnormal situation but also the time allowable for handling the occurred abnormal situation are informed. Therefore, the station staff and the like can cope with the abnormal situation corresponding to the circumstances on an ad hoc basis.

Further, according to the present embodiment, since the attribute of an object fallen from a platform of a station to a railway track is detected and the time allowable for handling the abnormal situation is calculated on the basis of the detected attribute, it is possible to cope with the abnormal situation more flexibly and mode efficiently.

Furthermore, according to the present embodiment, the place where the object has fallen that is an occurrence place of the abnormal situation is detected, and the time allowable for handling the abnormal situation is calculated according to the detected place. Therefore, even in the case where the occurrence place of the abnormal situation is far from the station building where the staff and the like are present, handling can be made within the time. As a result, it is possible to complete the handling more reliably.

Moreover, according to the present invention, when the handling time becomes 0 or smaller, protection radio can be transmitted automatically. Therefore, the worst case can be avoided reliably. Note that before transmitting protection radio, that is, before the handling time becomes 0 or smaller, it is possible to make voice communication with the staff or command and to stop the nearby trains emergently only when needed. Moreover, it is also possible to stop a train in a manner similar to the case where another train is at a stop before it, rather than stop it emergently. For example, on the assumption that a train is present at the place where an abnormality occurs, a stop instruction may be issued in front of the corresponding section by signal control or the like.

In the present embodiment, an event that a fall of an object from a platform of a station to a railway track is considered as an abnormal situation. However, as another embodiment, quarrel at a platform of a station, congestion of people, falling down of a person, unsteady walking, or the like may be detected as an abnormal situation. As still another embodiment, entering of an animal to a railway track may be detected as an abnormal situation. Such a situation may be detected at a place other than a train station or a signal station. In that case, the calculation unit 1193 may consider a train $c_k$ as a passing train without any conditions. As still another embodiment, it is possible to detect a plurality of types of abnormal situations such as a fall of an object from a platform of a station to a railway track, quarrel at a platform of a station, congestion of people, falling down of a person, unsteady walking, and entering of an animal to a railway track. In that case, the detection unit 1191 may detect the types of the abnormal situations having occurred, and generate the detection result 1184 while additionally including the types of the abnormal situations. Moreover, the calculation unit 1193 may be configured to calculate the handling time T according to the detected types of the abnormal situations. For example, as it is considered to be easy to cope with quarrel at a platform of a station, congestion of people, falling down of a person, unsteady walking, and the like compared with coping with a fall of a person to a railway track, the handling time may be increased (for example, a negative value it set to s in Expression 1). Moreover, as for unsteady walking of a person at a platform, in order to see how it goes for a while, the handling time may be increased, compared with the case of quarrel and a falling down of a person.

Second Exemplary Embodiment

Figure 10:
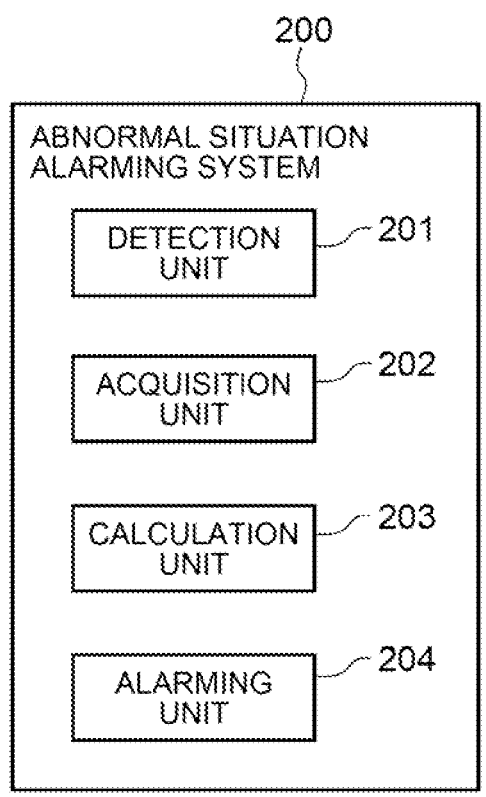
FIG. 10 is a block diagram of an abnormal situation alarming system according to a second exemplary embodiment of the present invention.

FIG. 10 is a block diagram of an abnormal situation alarming system 200 according to a second exemplary embodiment of the present invention. Referring to FIG. 10, the abnormal situation alarming system 200 is configured to include a detection unit 201, an acquisition unit 202, a calculation unit 203, and an alarming unit 204.

The detection unit 201 is configured to detect an abnormal situation. The detection unit 201 may have the same configuration as that of the detection unit 1191 of FIG. 3 for example, but is not limited thereto. For example, the detection unit 201 may be configured of an intelligent camera (for example, IP camera or network camera having therein an analysis unit, also referred to as a smart camera or the like). That is, an intelligent camera may detect an abnormal situation.

The acquisition unit 202 is configured to, when an abnormal situation is detected by the detection unit 201, acquire information representing the circumstances of the location where the abnormal situation has occurred. The acquisition unit 202 may have the same configuration as that of the acquisition unit 1192 of FIG. 3 for example, but is not limited thereto. For example, the acquisition unit 202 may be configured of an intelligent camera. That is, an intelligent camera may acquire information representing the circumstances of the location where the abnormal situation has occurred.

The calculation unit 203 is configured to calculate the time allowable for handling the abnormal situation, from the detection result of the abnormal situation by the detection unit 201 and the acquisition result of information by the acquisition unit 202. The calculation unit 203 may have the same configuration as that of the calculation unit 1193 of FIG. 3 for example, but is not limited thereto. For example, the calculation unit 203 may be configured of an intelligent camera. That is, an intelligent camera may calculate the time allowable for handling the abnormal situation, from the detection result of the abnormal situation and the surrounding information.

The alarming unit 204 is configured to give an alarm of the detection result of the abnormal situation by the detection unit 201 and the calculation result of the time allowable for handling the abnormal situation by the calculation unit 203. The alarming unit 204 may have the same configuration as that of the alarming unit 1194 of FIG. 3 for example, but is not limited thereto. For example, the alarming unit 204 may be configured of an intelligent camera. That is, an intelligent camera may give an alarm of the detection result of the abnormal situation and the calculated time.

FIG. 11 is a flowchart of an exemplary operation of the abnormal situation alarming system 200. Referring to FIG. 11, in the abnormal situation alarming system 200, first, the detection unit 201 detects an abnormal situation (step S11). Then, when an abnormal situation is detected by the detection unit 201, the acquisition unit 202 acquires information representing the circumstances of the location where the abnormal situation has occurred (step S12). Then, the calculation unit 203 calculates the time allowable for handling the abnormal situation, from the detection result of the abnormal situation by the detection unit 201 and the acquisition result of information by the acquisition unit 202 (step S13). Then, the alarming unit 204 gives an alarm of the detection result of the abnormal situation by the detection unit 201 and the calculation result of the time allowable for handling the abnormal situation by the calculation unit 203 (step S14).

The abnormal situation alarming system 200 according to the present embodiment can allow the staff to recognize not only the fact that an abnormal situation has occurred but also the time allowable for handling the abnormal situation having occurred, as described above. Therefore, it is possible to allow the staff to grasp the abnormal situation accurately. As a result, the staff can cope with an abnormal situation on an ad hoc basis according to the given time range.

Other Exemplary Embodiments

In the exemplary embodiments described above, description has been given on a system for detecting an abnormal situation that occurs in a station such as a fall of a person from a platform of the station to a railway track and quarrel at a platform and alarming it. However, the present invention is widely adaptable to a system for detecting an abnormal situation that occurs at a place other than a station and alarming it.

For example, the present invention can be used for a system for detecting an abnormal situation that occurs in a facility such as an elderly nursing home or a hospital, such as a fall of an inmate (a person staying in the facility or a patient) from a bed or going out of an inmate without approval, and alarming it. In such an abnormal situation alarming system, it is possible to use a detection unit that detects a fall or going out by analyzing the video of a camera, or detects a fall or going out by a range sensor, an infrared ray sensor, or the like, and detects the attributes such as age, disease history, and the like of a person who caused the abnormal situation from a server that manages the profiles of the inmates. Further, it is also possible to use an acquisition unit that acquires the room temperature in the case of a fall from a bed, and an acquisition unit that acquires the outside temperature, raining condition, traffic condition and the like in the case of going out without approval, as information representing the circumstances of the location where the abnormal situation has occurred. Further, it is also possible to use a calculation unit that calculates the time up to the timing when the room temperature becomes a certain level or lower or up to the timing when the rain of a certain level is expected, as a handling time that is the time allowable for handling the abnormal situation, or a calculation unit that has, in addition thereto, a function of correcting the handling time according to the attributes such as the age and disease history of a person who caused the abnormal situation, room temperature, outside temperature, raining condition, and traffic condition. Furthermore, as an alarming unit, it is possible to use one that gives an alarm of the fact that an abnormal situation has occurred and the handling time, by the sound and an image from a monitor provided to a management room of the facility.

Moreover, the present invention can be used for a system for detecting an abnormal situation that occurs during driving of an automobile such as a situation of encountering tailgating as an abnormal situation and alarming it. In such an abnormal situation alarming system, it is possible to use a detection unit that detects tailgating by another vehicle on the own vehicle (such as a vehicle with an abnormally short distance to the own vehicle) by analyzing video of cameras provided to the front, rear, left, and right of the vehicle. Moreover, it is possible to use an acquisition unit that acquires the road type, that is, whether or not the road on which the own vehicle is traveling is a general road or an expressway, congesting situation of the traveling road, and the state whether or not the own vehicle and other vehicle are stopped, as information representing the circumstances of the place where the abnormal situation has occurred. Furthermore, it is also possible to use a calculation unit that calculates, as the time allowable for handling the abnormal situation, when the own vehicle and the other vehicles are stopped, the minimum value (for example, 0) of the handling time, and when the own vehicle and the other vehicles are traveling, the time taken until it can arrive at the nearest parking area at a legally permitted speed in the case of an expressway, and the time taken until it can arrive at the nearest police station or police box at a legally permitted speed in the case of a general road. Further, as an alarming unit, it is possible to use one that transmits an alarm of encountering tailgating and the handling time, to a terminal device of an automobile insurance company that the own vehicle has a contract by email or the like.

While the present invention has been described with reference to the exemplary embodiments described above, the present invention is not limited to the above-described embodiments. The form and details of the present invention can be changed within the scope of the present invention in various manners that can be understood by those skilled in the art.

The present invention is based upon and claims the benefit of priority from Japanese patent application No. 2019-012231, filed on Jan. 28, 2019, the disclosure of which is incorporated herein in its entirety by reference.

INDUSTRIAL APPLICABILITY

The present invention is applicable to a system for detecting an abnormal situation such as a fall of a person from a platform of a station to a railway track and giving an alarm.

The whole or part of the exemplary embodiments disclosed above can be described as, but not limited to, the following supplementary notes.

Supplementary Note 1

An abnormal situation alarming system comprising:
a detection unit that detects an abnormal situation;
an acquisition unit that acquires, when the abnormal situation is detected, information representing a circumstance of a location where the abnormal situation occurred;
a calculation unit that calculates a time allowable for handling the abnormal situation, from a detection result of the abnormal situation and an acquisition result of the information; and
an alarming unit that gives an alarm of the detection result of the abnormal situation and a calculation result of the time.

Supplementary Note 2

The abnormal situation alarming system according to supplementary note 1, wherein
the detection unit is configured to detect an attribute of the object that caused the abnormal situation, and
the calculation unit is configured to calculate the time according to the attribute of the object.

Supplementary Note 3

The abnormal situation alarming system according to supplementary note 1 or 2, wherein the detection unit is configured to detect a place of occurrence of the abnormal situation, and the calculation unit is configured to calculate the time according to the place of occurrence.

Supplementary Note 4

The abnormal situation alarming system according to any of supplementary notes 1 to 3, wherein the detection unit is configured to detect a type of the abnormal situation, and the calculation unit is configured to calculate the time according to the type.

Supplementary Note 5

The abnormal situation alarming system according to any of supplementary notes 1 to 4, wherein the detection unit is configured to detect a fall of an object from a platform of a station to a railway track as the abnormal situation.

Supplementary Note 6

The abnormal situation alarming system according to supplementary note 5, wherein the detection unit is configured to output a detection result including occurrence time of the abnormal situation, a railway track number of the railway track to which the object is fallen, and an attribute of the object.

Supplementary Note 7

The abnormal situation alarming system according to supplementary note 6, wherein the acquisition unit is configured to acquire, as the information, passing time or arrival time of a train that passes or arrives first after the occurrence time, for each of the railway track of the railway track number and another railway track running parallel to the railway track with no platform being interposed.

Supplementary Note 8

The abnormal situation alarming system according to supplementary note 7, wherein the calculation unit is configured to calculate the time allowable for handling the abnormal situation, on a basis of passing time or arrival time of a plurality of trains that pass through or arrive at the railway track of the railway track number and the other railway track running parallel to the railway track with no platform being interposed, first after the occurrence time.

Supplementary Note 9

The abnormal situation alarming system according to supplementary note 7, wherein the calculation unit is configured to calculate the time allowable for handling the abnormal situation, on a basis of passing time or arrival time of a plurality of trains that pass through or arrive at the railway track of the railway track number and the other railway track running parallel to the railway track with no platform being interposed, first after the occurrence time, and a type whether each of the trains is a train that stops at the station or a train that passes through the station.

Supplementary Note 10

The abnormal situation alarming system according to supplementary note 7, wherein the calculation unit is configured to calculate the time allowable for handling the abnormal situation, on a basis of passing time or arrival time of a plurality of trains that pass through or arrive at the railway track of the railway track number and the other railway track running parallel to the railway track with no platform being interposed, first after the occurrence time, a type whether each of the trains is a train that stops at the station or a train that passes through the station, and the attribute of the object.

Supplementary Note 11

An abnormal situation alarming method comprising:
detecting an abnormal situation;
upon detection of the abnormal situation, acquiring information representing a circumstance of a location where the abnormal situation occurred;
calculating a time allowable for handling the abnormal situation, from a detection result of the abnormal situation and an acquisition result of the information; and
giving an alarm of the detection result of the abnormal situation and a calculation result of the time.

Supplementary Note 12

The abnormal situation alarming method according to supplementary note 11, wherein the detecting includes detecting an attribute of an object that caused the abnormal situation, and the calculating includes calculating the time according to the attribute of the object.

Supplementary Note 13

The abnormal situation alarming method according to supplementary note 11 or 12, wherein the detecting includes detecting a place of occurrence of the abnormal situation, and the calculating includes calculating the time according to the place of occurrence.

Supplementary Note 14

The abnormal situation alarming method according to any of supplementary notes 11 to 13, wherein the detecting includes detecting a type of the abnormal situation, and the calculating includes calculating the time according to the type.

Supplementary Note 15

A program for causing a computer to perform processing of:

detecting an abnormal situation;
upon detection of the abnormal situation, acquiring information representing a circumstance of a location where the abnormal situation occurred;

calculating a time allowable for handling the abnormal situation, from a detection result of the abnormal situation and an acquisition result of the information; and giving an alarm of the detection result of the abnormal situation and a calculation result of the time.

REFERENCE SIGNS LIST 100 abnormal situation alarming system
101 monitoring camera
102 loudspeaker
103 station building monitor
104 control device
105 train operation management server
106 protection radio device
110 camera I/F unit
111 train operation management server I/F unit
112 protection radio I/F unit
113 loudspeaker I/F unit
114 monitor I/F unit
115 communication I/F unit
116 operation input unit
117 screen display unit
118 storage unit
119 arithmetic processing unit
121 platform
122-125 railway track
126 station building
200 abnormal situation alarming system
201 detection unit
202 acquisition unit
203 calculation unit
204 alarming unit
1181 program
1182 monitoring camera information
1183 railway track information
1184 detection result
1185 train operation information
1186 handling time

What is claimed is:

1. An abnormal situation alarming system comprising:
a memory storing program instructions; and
a processor coupled to the memory and configured to execute the program instructions to:
detect a fall of an object from a platform of a station to a railway track, as an abnormal situation;
upon detection of the abnormal situation, acquire passing time or arrival time of a train scheduled to first pass or arrive after the abnormal situation, for each of the track on which the object fell and other tracks running parallel to the track on which the object fell;
calculate a time allowable for handling the abnormal situation, based on the passing time or arrival time that is earliest for each of the track and the other tracks; and
provide an alarm of the detection result of the abnormal situation and the calculated time.

2. The abnormal situation alarming system according to claim 1, wherein
detection of the abnormal situation includes detecting an attribute of the object that caused the abnormal situation, and
calculation of the time includes calculating the time according to the attribute of the object.

3. The abnormal situation alarming system according to claim 1, wherein
detection of the abnormal situation includes detecting a place of occurrence of the abnormal situation, and
calculation of the time includes calculating the time according to the place of occurrence.

4. The abnormal situation alarming system according to claim 1, wherein
detection of the abnormal situation includes outputting a detection result including occurrence time of the abnormal situation, a railway track number of the railway track to which the object is fallen, and an attribute of the object.

5. The abnormal situation alarming system according to claim 4, wherein
acquisition of the passing time or arrival time includes acquiring the passing time or arrival time of a train that first passes or arrives after the occurrence time, for each of the railway track of the railway track number and another railway track running parallel to the railway track with no platform being interposed.

6. The abnormal situation alarming system according to claim 5, wherein
calculation of the time includes calculating the time allowable for handling the abnormal situation, on a basis of the passing time or arrival time of each of a plurality of trains that first pass through or arrive at the railway track of the railway track number and the other railway track running parallel to the railway track with no platform being interposed, after the occurrence time.

7. The abnormal situation alarming system according to claim 5, wherein
calculation of the time includes calculating the time allowable for handling the abnormal situation, on a basis of the passing time or arrival time of each of a plurality of trains that first pass through or arrive at the railway track of the railway track number and the other railway track running parallel to the railway track with no platform being interposed, after the occurrence time, and a type as to whether each of the trains is a train that stops at the station or a train that passes through the station.

8. The abnormal situation alarming system according to claim 5, wherein
calculation of the time includes calculating the time allowable for handling the abnormal situation, on a basis of the passing time or arrival time of each of a plurality of trains that first pass through or arrive at the railway track of the railway track number and the other railway track running parallel to the railway track with no platform being interposed, first after the occurrence time, a type as to whether each of the trains is a train that stops at the station or a train that passes through the station, and the attribute of the object.

9. An abnormal situation alarming method performed by a computer comprising:
detecting a fall of an object from a platform of a station to a railway track, as an abnormal situation;
upon detection of the abnormal situation, acquiring passing time or arrival time of a train scheduled to first pass or arrive after the abnormal situation, for each of the track on which the object fell and other tracks running parallel to the track on which the object fell;
calculating a time allowable for handling the abnormal situation, based on the passing time or arrival time that is earliest for each of the track and the other tracks; and
providing an alarm of the detection result of the abnormal situation and the calculated time.

10. The abnormal situation alarming method according to claim 9, wherein detection of the abnormal situation includes detecting an attribute of the object that caused the abnormal situation, and calculation of the time includes calculating the time according to the attribute of the object.

11. The abnormal situation alarming method according to claim 9, wherein detection of the abnormal situation includes detecting a place of occurrence of the abnormal situation, and calculation of the time includes calculating the time according to the place of occurrence.

12. A non-transitory computer-readable storage medium storing a program comprising instructions for causing a computer to perform processing comprising:

detecting a fall of an object from a platform of a station to a railway track, as an abnormal situation;

upon detection of the abnormal situation, acquiring passing time or arrival time of a train scheduled to first pass or arrive after the abnormal situation, for each of the track on which the object fell and other tracks running parallel to the track on which the object fell;

calculating a time allowable for handling the abnormal situation, based on the passing time or arrival time that is earliest for each of the track and the other tracks; and providing an alarm of the detection result of the abnormal situation and the calculated time.

13. The abnormal situation alarming method according to claim 4, wherein detection of the abnormal situation includes outputting a detection result including occurrence time of the abnormal situation, a railway track number of the railway track to which the object is fallen, and an attribute of the object.

14. The abnormal situation alarming method according to claim 13, wherein acquisition of the passing time or arrival time includes acquiring the passing time or arrival time of a train that first passes or arrives first after the occurrence time, for each of the railway track of the railway track number and another railway track running parallel to the railway track with no platform being interposed.

15. The abnormal situation alarming method according to claim 14, wherein calculation of the time includes calculating the time allowable for handling the abnormal situation, on a basis of the passing time or arrival time of each of a plurality of trains that first pass through or arrive at the railway track of the railway track number and the other railway track running parallel to the railway track with no platform being interposed, after the occurrence time.

* * * * *